US009562596B2

(12) United States Patent
Kamada (10) Patent No.: US 9,562,596 B2
(45) Date of Patent: Feb. 7, 2017

(54) GEAR MECHANISM AND DRAWER DRIVE DEVICE IN REFRIGERATOR

(71) Applicant: NIDEC SANKYO CORPORATION, Nagano (JP)

(72) Inventor: Toru Kamada, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 202 days.

(21) Appl. No.: 14/339,930

(22) Filed: Jul. 24, 2014

(65) Prior Publication Data

US 2015/0027247 A1    Jan. 29, 2015

(30) Foreign Application Priority Data

Jul. 26, 2013  (JP) ................................. 2013-155752
May 13, 2014  (JP) ................................. 2014-099163

(51) Int. Cl.
*F16H 19/04*    (2006.01)
*F16H 1/20*     (2006.01)
*F16H 35/10*    (2006.01)
*F25D 25/02*    (2006.01)

(52) U.S. Cl.
CPC ............. *F16H 35/10* (2013.01); *F25D 25/025* (2013.01); *A47B 2210/175* (2013.01); *Y10T 74/18096* (2015.01); *Y10T 74/19614* (2015.01)

(58) Field of Classification Search
CPC .................. A47B 2210/175; Y10T 74/18096; F16D 7/048; F16D 41/12
See application file for complete search history.

(56) References Cited

U.S. PATENT DOCUMENTS

| 3,406,583 | A | * | 10/1968 | Baier | F16D 7/048 |
| | | | | | 464/23 |
| 5,396,945 | A | * | 3/1995 | Meyer | E06B 9/322 |
| | | | | | 160/177 R |
| 5,601,491 | A | * | 2/1997 | Chan | F16D 7/048 |
| | | | | | 192/56.1 |
| 2014/0157926 | A1 | * | 6/2014 | Fujisawa | F16H 35/10 |
| | | | | | 74/421 R |

FOREIGN PATENT DOCUMENTS

JP    2003185333 A    7/2003

* cited by examiner

*Primary Examiner* — Terence Boes
(74) *Attorney, Agent, or Firm* — Cantor Colburn LLP (57) ABSTRACT

A gear mechanism may include a first gear, a second gear which is coaxially disposed with the first gear and is provided with a recessed part on an end face of a first gear side, and a torque limiter provided between the first gear and the second gear. The torque limiter includes inner teeth provided on a ring-shaped inner peripheral face of the recessed part, and a torque limiter member provided with an engaging claw capable of engaging with the inner teeth and integrally rotating with the first gear in the recessed part. The second gear is an inclined teeth gear whose teeth bottoms are inclined with respect to an axial line direction and teeth bottoms of the inner teeth are extended in parallel with the axial line direction. The gear mechanism may be utilized in a drawer drive device in a refrigerator which includes a motor, a rack linearly moved by the motor for moving a drawer in the refrigerator, an output gear engaged with the rack, and a rotation transmission mechanism for transmitting rotation of the motor to the output gear. The rotation transmission mechanism includes the gear mechanism and a worm gear.

11 Claims, 7 Drawing Sheets

GEAR MECHANISM AND DRAWER DRIVE DEVICE IN REFRIGERATOR

CROSS REFERENCE TO RELATED APPLICATION

The present invention claims priority under 35 U.S.C. §119 to Japanese Application No. 2013-155752 filed Jul. 26, 2013 and Japanese Application No. 2014-099163 filed May 13, 2014, the entire contents of which are incorporated herein by reference.

FIELD OF THE INVENTION

At least an embodiment of the present invention may relate to a gear mechanism on which a torque limiter is mounted, and a drawer drive device used in a refrigerator which includes a gear train for transmitting rotation of a motor having a gear mechanism on which a torque limiter is mounted.

BACKGROUND

A drawer drive device by which a drawer or the like in a refrigerator is automatically set in an open state is described in Japanese Patent Laid-Open No. 2003-185333. A drawer drive device described in the Patent Literature includes a motor as a drive source and a linearly moving member which is connected with a drawer. Rotation of the motor is transmitted to the linearly moving member through a reduction gear train and a rotation-linear motion conversion mechanism and thereby the drawer is moved from a close position to an open position as the linearly moving member is moved in one direction.

The drawer which is to be moved from a close position to an open position by driving of a motor may be forcibly prevented from its movement by a user. In this case, a large force applied to the drawer by a user is transmitted to the motor through the rotation-linear motion conversion mechanism and the reduction gear train and thus structural members structuring the rotation-linear motion conversion mechanism and the reduction gear train and the motor may be damaged by the force. In order to prevent this damage, in the drive device in the above-mentioned Patent Literature, a torque limiter is arranged on the way of the reduction gear train so that a large force applied to the drawer is prevented from being transmitted to the motor.

The torque limiter described in above-mentioned Patent Literature is provided between two spur gears which are coaxially disposed. Further, one of two spur gears which are coaxially disposed is formed with a recessed part on an end face on the other spur gear side and the torque limiter is structured in the recessed part.

When a torque limiter is structured in the recessed part which is provided on an end face of a spur gear, a space for disposing the torque limiter is required to secure on its inner peripheral side and thus it is difficult to reduce the size of the spur gear in a radial direction.

If a space between a circumscribing circle which circumscribes the recessed part and a tooth tip circle of the spur gear is set to be small, the size of the spur gear can be reduced in the radial direction while securing a space structuring the torque limiter on an inner peripheral side of the spur gear. However, when the gear mechanism is structured as described above, a tube-shaped part which is located on an outer peripheral side relative to the recessed part of the spur gear may be easily damaged by a force which is transmitted through the torque limiter. Especially, in a case that the torque limiter is structured of inner teeth which are formed on a ring-shaped inner peripheral face of the recessed part and a torque limiter member provided with a locking pawl for engaging with the inner teeth, when a space between the circumscribing circle which circumscribes the recessed part and a tooth tip circle of outer teeth of the spur gear is set to be small, the thickness in the radial direction becomes extremely thin at a portion of the tube-shaped part where a tooth bottom of the outer teeth is located on its outer peripheral side and where a tooth bottom of the inner teeth is located on its inner peripheral side. Further, the thin portion is extended in an axial line direction and is formed at plural positions with a constant interval in the circumferential direction. As a result, strength of the spur gear is decreased and the spur gear is easily damaged.

SUMMARY

In view of the problem described above, at least an embodiment of the present invention may advantageously provide a gear mechanism including a torque limiter which is structured in a recessed part provided on an end face of a gear and the size of the gear can be reduced while suppressing lowering of strength of the gear. Further, at least an embodiment of the present invention may advantageously provide a drawer drive device used in a refrigerator which includes a gear train for transmitting rotation of a motor having a gear mechanism on which a torque limiter is mounted.

According to at least an embodiment of the present invention, there may be provided a gear mechanism including a first gear, a second gear which is coaxially disposed with the first gear and is provided with a recessed part on an end face of a first gear side, and a torque limiter provided between the first gear and the second gear. The torque limiter includes inner teeth which are provided on a ring-shaped inner peripheral face of the recessed part, and a torque limiter member which is provided with an engaging claw which is capable of engaging with the inner teeth and integrally rotates together with the first gear in the recessed part. Further, the second gear is an inclined teeth gear whose teeth bottoms are inclined with respect to an axial line direction and teeth bottoms of the inner teeth are extended in parallel with the axial line direction.

According to at least an embodiment of the present invention, the second gear provided with a recessed part for the torque limiter on its end face is an inclined teeth gear, and teeth bottoms of outer teeth formed in a tube-shaped part on an outer peripheral side with respect to the recessed part are extended in an inclined direction with respect to the axial line direction. Therefore, even when the torque limiter is structured of inner teeth, which are formed on a ring-shaped inner peripheral face of the recessed part, and a torque limiter member provided with an engaging claw which is engaged with the inner teeth, a thin portion extended in the axial line direction is prevented or restrained from being formed in the tube-shaped part with a constant interval in the circumferential direction. As a result, lowering of strength of the second gear can be suppressed and thus, in comparison with a case that the second gear is a spur gear, a space in the end face between the circumscribing circle circumscribing the recessed part and the tooth tip circle can be made narrower and the second gear can be made smaller in the radial direction. Further, the second gear can be made small and thus the size of the gear mechanism is easily reduced in the radial direction.

In at least an embodiment of the present invention, one end portion in the axial line direction of the tooth bottom formed on an outer peripheral face of the second gear is displaced from the other end portion in the axial line direction of the tooth bottom in a circumferential direction and, when viewed in the axial line direction, the one end portion is not overlapped with the other end portion. According to this structure, when the second gear is viewed in the radial direction, a tooth tip of an outer peripheral face of the second gear is always overlapped with a tooth bottom of the inner teeth in an intersected manner. Alternatively, when the second gear is viewed in the radial direction, at a position where a tooth bottom of the inner teeth which are formed in the second gear is overlapped with a tooth bottom of the inclined teeth gear, the tooth bottom of the inclined teeth gear intersects the tooth bottom of the inner teeth obliquely. Therefore, a thin portion extended parallel to the axial line direction is not formed in the tube shape part. In this case, it may be structured that the inclined teeth gear which is the second gear is engaged with a worm gear which is rotationally driven by a motor.

In at least an embodiment of the present invention, the torque limiter member is provided with a body part which is coaxially provided with the first gear and an arm part which is protruded to an outer peripheral side from the body part and is extended in the circumferential direction, and a tip end side portion of the arm part is capable of displacing in the radial direction. The engaging claw is provided at a tip end portion of the arm part, the arm part is located on an outer peripheral side relative to the first gear when viewed in the axial line direction, and the first gear and the torque limiter member are integrally molded by using resin. According to the torque limiter having such a structure, variation of a torque is suppressed by forming the torque limiter member large in the radial direction and, as a result, operation of the torque limiter can be made stable. Therefore, although the recessed part of the second gear in which the torque limiter member is accommodated is required to form large in the radial direction, even in this case, the second gear is an inclined teeth gear and thus increase of the size in the radial direction is restrained while suppressing lowering of strength of the second gear.

In at least an embodiment of the present invention, the second gear is provided with a tube part which is extended in the axial line direction from a bottom face of the recessed part, and a center hole of the tube part penetrates through the second gear and is formed as a bearing into which a support shaft for rotatably supporting the second gear is inserted. According to this structure, the size of the torque limiter member is increased in the radial direction because its recessed part is provided with the tube part and thus the recessed part of the second gear may be required to form large in the radial direction. However, even in this case, the second gear is an inclined teeth gear and thus increase of the size in the radial direction is restrained while suppressing lowering of strength of the second gear.

Next, in view of the problem described above, at least an embodiment of the present invention may advantageously provide a drawer drive device used in a refrigerator including a motor, a rack which is linearly moved by the motor for moving a drawer in the refrigerator, an output gear which is engaged with the rack, and a rotation transmission mechanism for transmitting rotation of the motor to the output gear. The rotation transmission mechanism includes the above-mentioned gear mechanism and a worm gear which is engaged with the second gear of the gear mechanism, and rotation of the motor is transmitted to the worm gear, the second gear and the first gear of the gear mechanism in this order.

According to at least an embodiment of the present invention, the rotation transmission mechanism which transmits rotation of the motor to the rack includes the gear mechanism having the torque limiter. Therefore, during the rack is linearly moved by rotation of the motor to move the drawer in an open direction, even in a case that its movement is forcibly prevented by a user, a large force applied to the drawer by the user is prevented from being transmitted to the motor by the torque limiter. Accordingly, the rotation transmission mechanism and the motor can be prevented from being damaged due to a force from the drawer side. Further, since the size of the gear mechanism can be easily reduced in the radial direction, the size of the drawer drive device is easily reduced. In addition, a gear engaged with the second gear of the gear mechanism on which the torque limiter is mounted is a worm gear and thus, in comparison with a case that a gear engaged with the second gear which is an inclined teeth gear is an inclined teeth gear, the number of the inclined teeth gears whose working is difficult is reduced. In this case, when the worm gear is attached to an output shaft of the motor, the size of the drawer drive device used in a refrigerator can be made small. Further, a motor which is capable of rotating in both directions may be used as the motor.

In at least an embodiment of the present invention, a torque which is required to rotate the worm gear by the second gear is smaller than the maximum torque of the torque limiter which is capable of transmitting rotation from the second gear to the first gear. According to this structure, when the drawer is pushed toward the close position by a small force, the drawer can be moved while rotating the worm gear.

In at least an embodiment of the present invention, the axial line direction of the gear mechanism is directed in a direction which is parallel with a rotation shaft of the output gear and is perpendicular to a linearly moving direction of the rack, and the gear mechanism is disposed between the motor and the output gear in the linearly moving direction. According to this structure, the size of the device can be reduced in the linearly moving direction of the rack by reducing the size of the gear mechanism in the radial direction.

In at least an embodiment of the present invention, the axial line direction of the gear mechanism is directed in a direction which is parallel with a rotation shaft of the output gear and is perpendicular to a linearly moving direction of the rack, and the gear mechanism is disposed between the worm gear and the rack in an orthogonal direction perpendicular to the linearly moving direction and the axial line direction. According to this structure, the size of the device can be reduced in the orthogonal direction by reducing the size of the gear mechanism in the radial direction.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

Entire Structure

Figure 1:
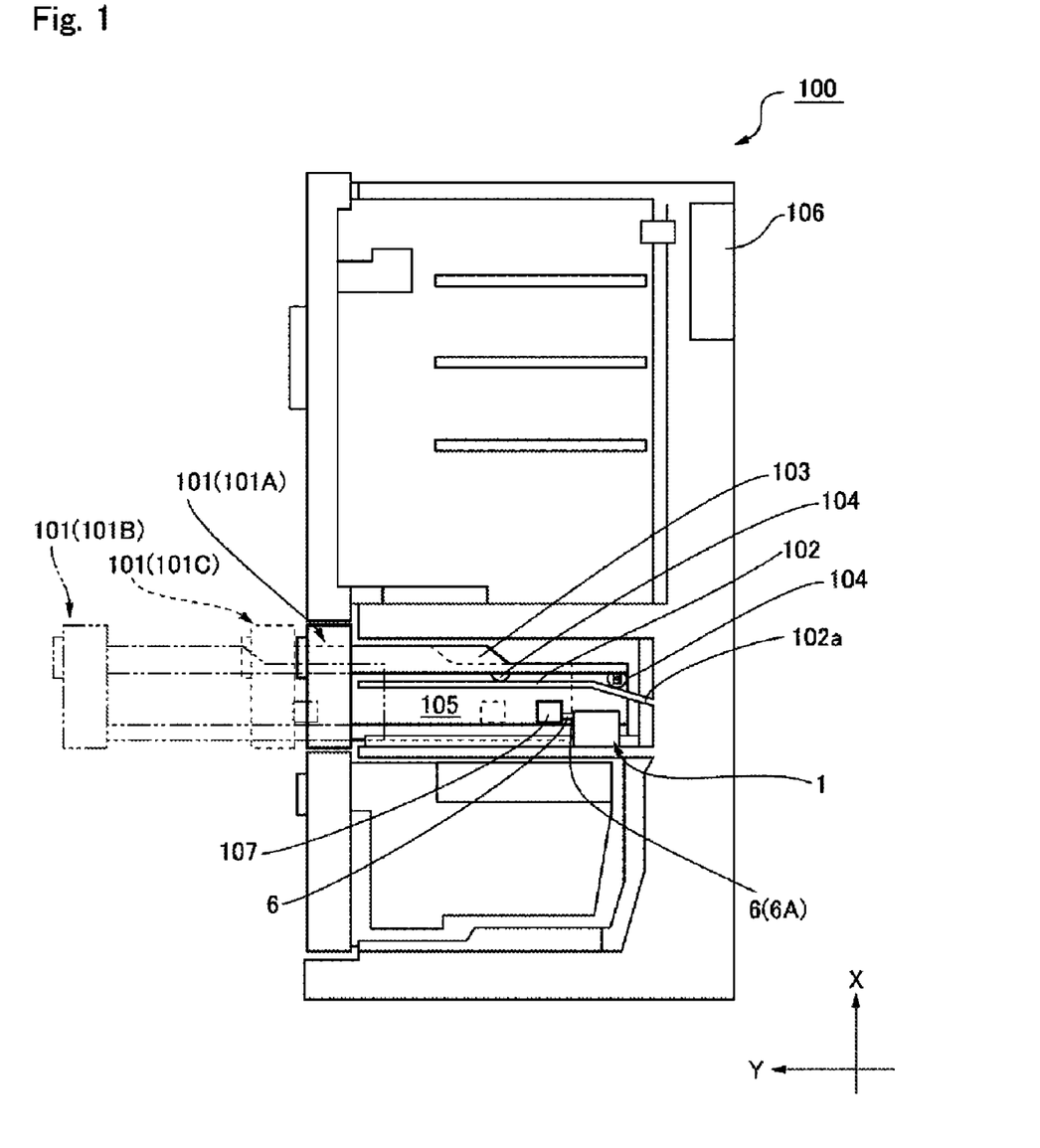
FIG. 1 is an explanatory view showing a mounted state of a drawer drive device on a refrigerator.
Figure 2:
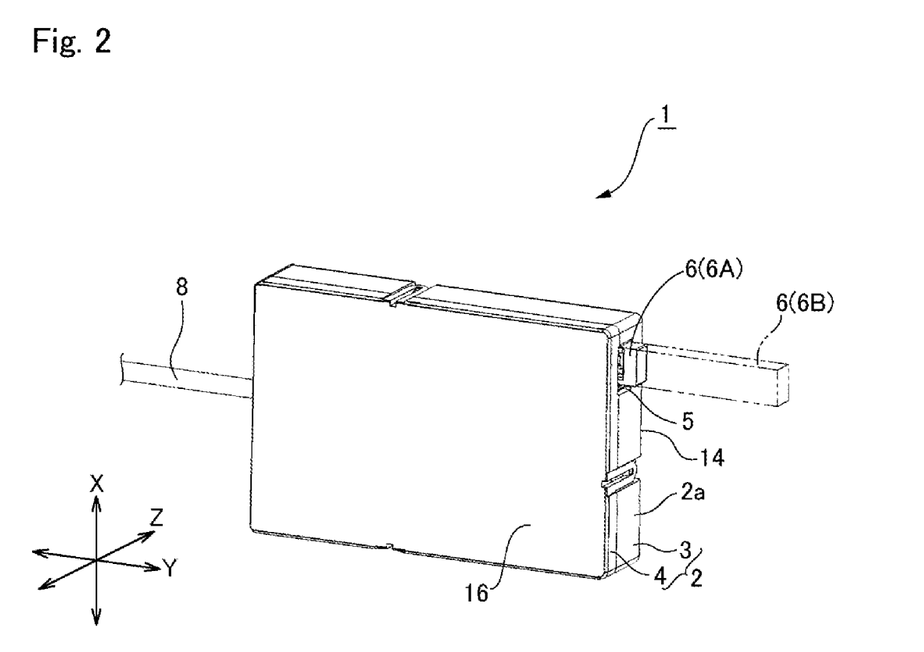
FIG. 2 is a perspective view showing a drawer drive device in accordance with an embodiment of the present invention.

A drawer drive device in accordance with an embodiment of the present invention will be described below with reference to the accompanying drawings. FIG. 1 is an explanatory view showing a mounted state of a drawer drive device on a refrigerator. FIG. 2 is a perspective view showing a drawer drive device in accordance with an embodiment of the present invention. As shown in FIG. 1, a drawer drive device 1 in accordance with an embodiment of the present invention is mounted on a refrigerator 100, and a refrigerating chamber, a freezing chamber or a vegetable chamber which is structured as a drawer 101 is opened. The drawer 101 is placed in a slidable state on a pair of rails 102 which are extended in a front and rear direction on both sides in a widthwise direction interposing the drawer 101 when the refrigerator 100 is viewed from a front face side.

Rollers 104 are mounted on an outer frame part 103 of the drawer 101 which is located above the rails 102 and the drawer 101 is capable of moving along the rail 102 smoothly. The drawer 101 is capable of moving between a close position 101A where a box part 105 of the drawer 101 is accommodated in an inside of the refrigerator 100 and an open position 101B where the box part 105 is disposed on an outer side with respect to the refrigerator 100.

In the refrigerator 100 in this embodiment, an inclined rail portion 102a which is inclined downward toward the rear side is provided on rear end portions of a pair of the rails 102. When the drawer 101 is located in the vicinity of the close position 101A, the drawer 101 is set in a state that the rollers 104 on a rear side are disposed on the inclined rail portions 102a and the drawer 101 is moved backward by its own weight and is located at the close position 101A.

The drawer drive device 1 is disposed between the drawer 101 and one of side walls (not shown) of the refrigerator 100. When a switch (not shown) for opening the drawer 101 is operated, a drive signal is transmitted to the drawer drive device 1 from a control section 106 of the refrigerator 100. The drawer drive device 1 is operated by a drive signal and thereby the drawer drive device 1 pushes out the drawer 101 located at the close position 101A which is accommodated in the refrigerator 100 to the opened position 101C forwardly separated from the close position 101A with a predetermined distance. The opened position 101C is located between the close position 101A and the open position 101B and near to the close position 101A.

As shown in FIG. 2, the drawer drive device 1 is provided with a case 2 in a rectangular parallelepiped shape as a whole. The case 2 includes a first case 3 and a second case 4 which are arranged in a widthwise direction of the drawer drive device 1. An opening part 5 is formed on an upper side portion of a front face 2a of the case 2. A tip end portion of a rack 6 for pushing out the drawer 101 to a front side is protruded outwardly from the opening part 5. A state shown by the solid line in FIG. 1 is a state that the rack 6 is located at a standby position 6A. When the drawer 101 is to be pushed out by the rack 6, the rack 6 is moved forward to a protruded position 6B shown by the two-dot chain line in FIG. 2.

A tip end side of the rack 6 is structured as an abutting part for an operated part 107 (see FIG. 1) provided in the drawer 101. The operated part 107 is a protruded part protruding toward the drawer drive device 1 in a widthwise direction of the refrigerator 100 from a side face of the box part 105 of the drawer 101. As shown in FIG. 1, the drawer drive device 1 is mounted at a position where the tip end side of the rack 6 is abutted with the operated part 107 of the drawer 101 located at the close position 101A from a rear side in a state that the rack 6 is disposed at the standby position 6A.

A wiring line 8 is extended from the case 2 toward a rear side. When a switch for opening the drawer 101 is operated, a drive signal is inputted into the drawer drive device 1 from the control section 106 of the refrigerator 100 through the wiring line 8. When a drive signal is inputted, a motor 11 (see FIGS. 3(a) and 3(b)) is driven and the rack 6 is straightly moved to the protruded position 6B from the standby position 6A. Since the operated part 107 of the drawer 101 is pushed to a front side by movement of the rack 6, the drawer 101 is located at the opened position 101C which is separated from the close position 101A to the front side by a moved distance of the rack 6.

(Internal Structure)

Figure 3A:
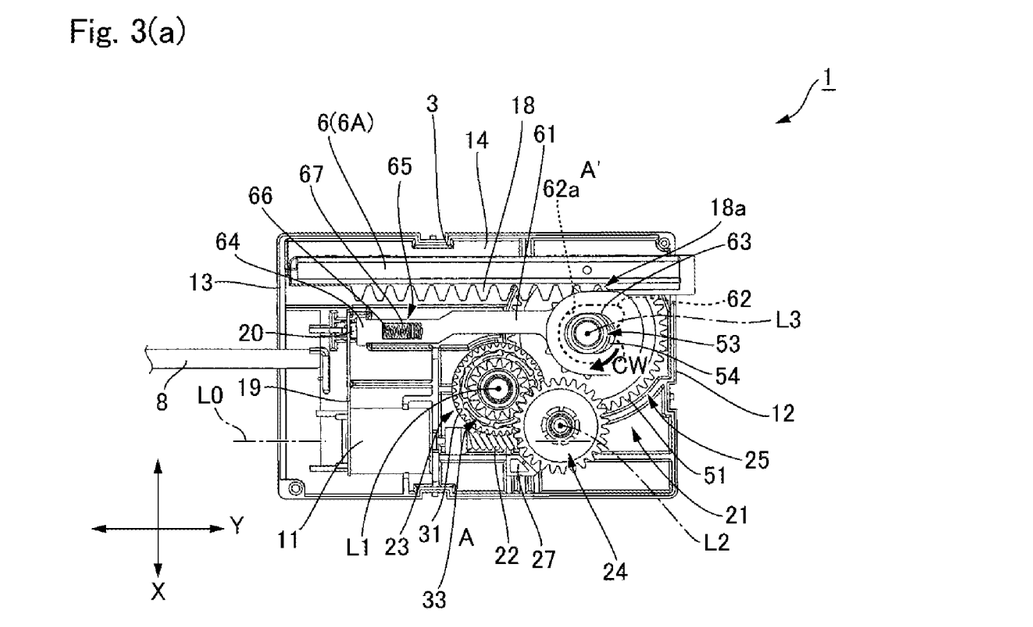
FIGS. 3(a) and 3(b) are side views showing a drawer drive device from which a second case is detached.
Figure 3B:
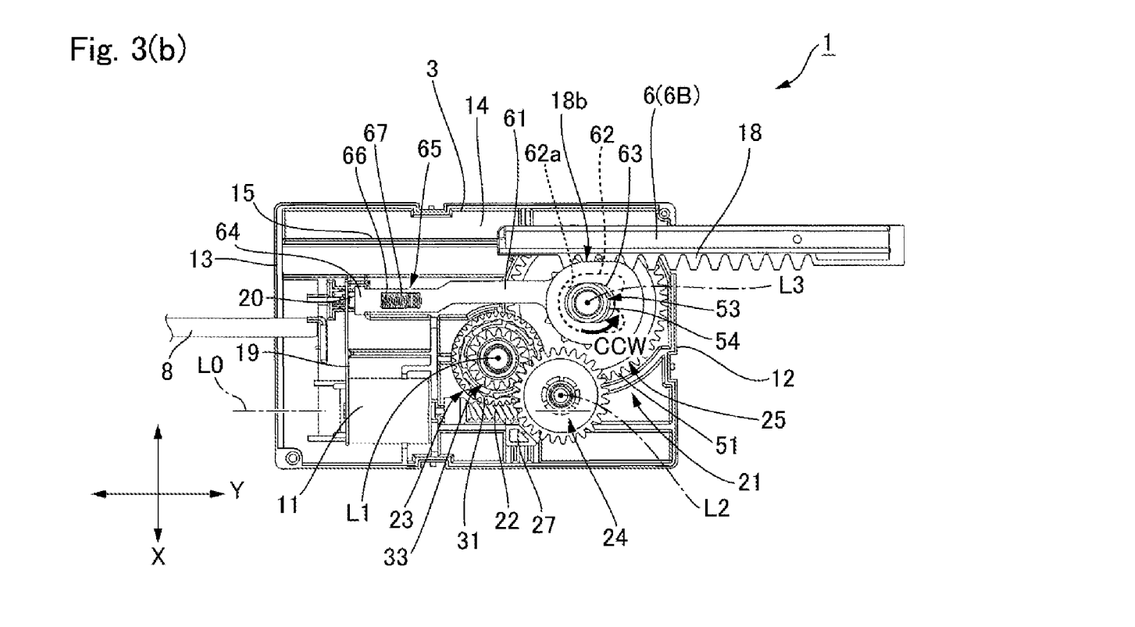
Figure 4:
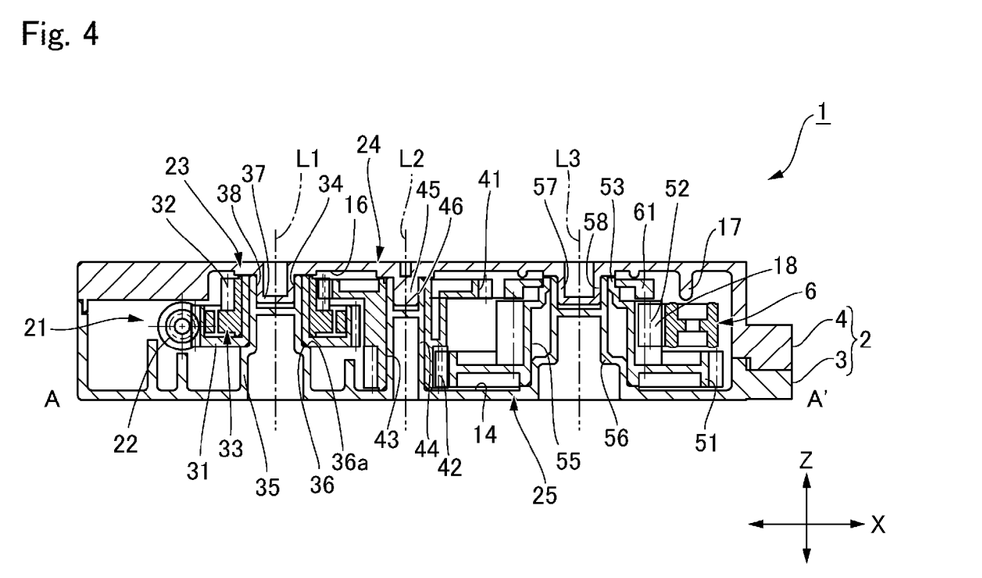
FIG. 4 is a developed view showing a gear train of a rotation transmission mechanism.

FIGS. 3(a) and 3(b) are side views showing the drawer drive device 1 from which the second case 4 is detached. FIG. 3(a) shows a state that the rack 6 is located at the standby position 6A and FIG. 3(b) shows a state that the rack 6 is located at the protruded position 6B. FIG. 4 is a developed view showing a gear train along the "A-A'" line in FIG. 3(a). In the following descriptions, in a state that the drawer drive device 1 is mounted on the refrigerator 100, a direction corresponding to the upper and lower direction of the refrigerator 100 is referred to as an "X" direction, a direction corresponding to the front and rear direction of the refrigerator 100 is referred to as a "Y" direction, and a direction corresponding to a widthwise direction of the refrigerator 100 is referred to as a "Z" direction. Further, the drawer drive device 1 will be described below with an upper side and a lower side of the refrigerator 100 respectively referred to as an upper side and a lower side in the "X" direction, and a front side and a rear side of the refrigerator 100 respectively referred to as a front side and a rear side in the "Y" direction.

As shown in FIGS. 3(a) and 3(b), the rack 6 is mounted on an upper side portion in the "X" direction of the first case 3. The rack 6 is extended long in the "Y" direction and its front end portion is protruded to the front side relative to a front plate 12 of the first case 3. As shown in FIG. 3(a), in a state that the rack 6 is located at the standby position 6A, a rear end of the rack 6 is located in the vicinity of a rear plate 13 of the first case 3. The rack 6 is supported by the case 2 in a slidable state in the "Y" direction through a first linear movement guide 15 (see FIG. 3(b)) provided so as to protrude in the "Z" direction from a side plate 14 of the first case 3, a second linear movement guide 17 (see FIG. 4) provided so as to protrude in the "X" direction from a side plate 16 of the second case, and the like. A teeth part 18 is provided on a lower side of the rack 6.

The motor 11 is mounted on a rear side of a lower side portion in the "X" direction of the first case 3. The motor 11 is disposed so that its motor axial line "L0" is extended in the "Y" direction. In other words, the motor 11 is disposed so that its motor axial line "L0" is parallel to a linearly moving direction of the rack 6 ("Y" direction). A circuit board 19 is disposed on a rear side in the "Y" direction which is an opposite-to-output side of the motor 11. The circuit board 19 is extended in the "X" direction and the motor 11 is mounted on a lower end portion of a front face of the circuit board 19. A tact switch 20 is mounted on an upper end portion of the front face of the circuit board 19.

A rotation transmission mechanism 21 through which rotation of the motor 11 is decelerated and transmitted to the rack 6 is disposed in a front side space of the first case 3 with respect to the motor 11. The rotation transmission mechanism 21 includes a worm gear 22 attached to an output shaft of the motor 11, a first composite gear (gear mechanism) 23, a second composite gear 24 and an output gear 25. The output gear 25 is disposed in a front end portion of the first case 3 and is engaged with the teeth part 18 of the rack 6. When the motor 11 is driven in a first direction from the state shown in FIG. 3(a) and the output gear 25 is turned in a clockwise "CW" direction by one rotation, the rack 6 is moved from the standby position 6A to the protruded position 6B shown in FIG. 3(b). On the other hand, the motor 11 is driven in a second direction which is opposite to the first direction from the state shown in FIG. 3(b) and, when the output gear 25 is turned in a counterclockwise "CCW" direction by one rotation, the rack 6 is moved from the protruded position 6B to the standby position 6A shown in FIG. 3(a). In other words, the motor 11 in this embodiment is a motor which is capable of rotating in both directions.

The worm gear 22 is coaxially attached to an output shaft of the motor 11. An end portion of the worm gear 22 on an opposite side to the motor 11 is rotationally supported by a bearing 27 which is fixed to the first case 3.

The first composite gear 23 includes, as shown in FIG. 4, a first large diameter gear (second gear) 31, which is engaged with the worm gear 22, and a first small diameter gear (first gear) 32, which is coaxial with the first large diameter gear 31 and whose diameter is smaller than that of the first large diameter gear 31. The first large diameter gear 31 is located on the first case 3 side and the first small diameter gear 32 is located on the second case 4 side. The first large diameter gear 31 and the first small diameter gear 32 are structured in a separate manner and a torque limiter 33 is structured between the first large diameter gear 31 and the first small diameter gear 32 so as to be coaxial with the first large diameter gear 31 and the first small diameter gear 32. In other words, the first composite gear 23 is a gear mechanism which is mounted with the torque limiter 33.

The first large diameter gear 31 is provided with a first center hole 34 which penetrates in the "Z" direction. The first center hole 34 is inserted with a first support shaft 35 protruding from the side plate 14 of the first case 3 toward a side of the second case 4 in the "Z" direction. More specifically, the first support shaft 35 is provided with a ring-shaped step part 36 at a middle in the "Z" direction, and the first composite gear 23 is supported on a side of the second case 4 relative to the step part 36 in a state that an opening edge of a lower end opening of the first center hole 34 is abutted with a ring-shaped end face 36a facing an upper side of the step part 36. An upper side portion relative to the step part 36 of the first support shaft 35 is inserted into the first center hole 34. In this manner, the first composite gear 23 is supported rotatably around the first axial line "L1" (axial line) of the first support shaft 35. Further, a first protruded part 37 which protrudes toward the first case 3 from the side plate 16 of the second case 4 is provided in the second case 4 at a position facing the first support shaft 35, and the first protruded part 37 is inserted into a first recessed part 38 provided at a tip end of the first support shaft 35. Respective movements in the "Z" direction of the first composite gear 23 are restricted by the side plate 16 of the second case 4 and the step part 36 of the first support shaft 35.

The second composite gear 24 is provided with a second large diameter gear 41 which is engaged with the first small diameter gear 32 of the first composite gear 23 and a second small diameter gear 42 which is coaxial with the second large diameter gear 41 and whose diameter is smaller than that of the second large diameter gear 41. The second small diameter gear 42 is located on a side of the first case 3 relative to the first large diameter gear 31 of the first composite gear 23 and the second large diameter gear 41 is located on a side of the second case 4 relative to the first large diameter gear 31 of the first composite gear 23. The second composite gear 24 is a resin molded product structured of the second large diameter gear 41 and the second small diameter gear 42 which are integrally molded each other.

The second composite gear 24 is provided with a second center hole 43 which penetrates in the "Z" direction. The second center hole 43 is inserted with a second support shaft 44 which is protruded in the "Z" direction from the side plate 14 of the first case 3 toward the second case 4 and, in this manner, the second composite gear 24 is rotatably supported around a second axial line "L2" of the second support shaft 44. A second protruded part 45 which protrudes from the side plate 16 of the second case 4 toward the first case 3 is provided at a position of the second case 4 facing the second support shaft 44 and the second protruded part 45 is inserted into a second recessed part 46 provided at a tip end of the second support shaft 44. Respective movements in the "Z" direction of the second composite gear 24 are restricted by the side plate 14 of the first case 3 and the side plate 16 of the second case 4.

The output gear 25 is provided with a large diameter gear 51 which is engaged with a second small diameter gear 42 and a small diameter gear 52 whose diameter is smaller than that of the large diameter gear 51 and which is engaged with the teeth part 18 of the rack 6. The large diameter gear 51 is located on a side of the first case 3 and the small diameter gear 52 is located on a side of the second case 4. The small diameter gear 52 is, as shown in FIG. 3(a), engaged with a tip end part 18a of the teeth part 18 of the rack 6 in a state that the rack 6 is disposed at the standby position 6A. On the other hand, when the rack 6 is disposed at the protruded position 6B, as shown in FIG. 3(b), the small diameter gear 52 is engaged with a rear end part 18b of the teeth part 18 of the rack 6. A cam 53 is coaxially provided with the large diameter gear 51 and the small diameter gear 52 on an end face of the small diameter gear 52 on an opposite side to the large diameter gear 51 (on the end face on a side of the second case 4). The cam 53 is, as shown in FIGS. 3(a) and 3(b), provided with a protruded part 54 which is protruded in a radial direction at one position in the circumferential direction. The output gear 25 is a resin molded product structured of the large diameter gear 51, the small diameter gear 52 and the cam 53 which are integrally molded each other.

As shown in FIG. 4, the output gear 25 is provided with a center hole 55 which penetrates in the "Z" direction. The center hole 55 is inserted with a third support shaft 56 which is protruded in the "Z" direction from the side plate 14 of the first case 3 toward the second case 4 and, in this manner, the output gear 25 is rotatably supported around a third axial line "L3" of the third support shaft 56. Further, a third protruded part 57 protruding from the side plate 16 of the second case 4 toward the first case 3 is provided in the second case 4 at a position facing the third support shaft 56 and the third protruded part 57 is inserted into a third recessed part 58 provided at a tip end of the third support shaft 56. Respective movements in the "Z" direction of the output gear 25 are restricted by the side plate 14 of the first case 3 and the side plate 16 of the second case 4.

In this embodiment, when the rotation transmission mechanism 21 is viewed in a direction perpendicular to the "Z" direction (in a direction perpendicular to the first through the third axial lines "L1" through "L3"), as shown in FIG. 4, the first composite gear 23 is located on a side with respect to the small diameter gear 52 and the cam 53 of the output gear 25 and is disposed on a side of the second case 4 with respect to the large diameter gear 51 of the output gear 25. Further, when the rotation transmission mechanism 21 is viewed in the "Z" direction, as shown in FIGS. 3(a) and 3(b), the first composite gear 23 is disposed between the motor 11 and the output gear 25 in the "Y" direction (in the moving direction of the rack 6 and the motor axial line "L0" direction of the motor 11), and the first large diameter gear 31 of the first composite gear 23 and the large diameter gear 51 of the output gear 25 are partly overlapped with each other. Further, the first composite gear 23 is disposed between the rack 6 and the motor 11 in the "X" direction (in a perpendicular direction which is perpendicular to the moving direction of the rack 6 and the motor axial line "L0" direction of the motor 11).

As shown in FIGS. 3(a) and 3(b), a switch member 61 is extended between the circuit board 19 and the cam 53 of the output gear 25. The switch member 61 is extended in the "Y" direction and its front end portion is provided with a sliding part 62a which slides on the cam 53 and an elongated hole 63 which is penetrated in the "Z" direction. The sliding part 62a is a peripheral wall face of the recessed part 62, which is formed on a face on the side plate 14 side of the switch member 61 and the elongated hole 63 penetrates through a bottom face of the recessed part 62. The cam 53 is inserted into the recessed part 62 in the "Z" direction. A rear end part in the "Y" direction of the switch member 61 is formed as an operation part 64 for operating the tact switch 20 which is mounted on the circuit board 19. Further, a rectangular through hole 65 penetrating in the "Z" direction is formed at a portion of the switch member 61 which is nearer to the operation part 64 than the sliding part 62a. An engaging part 66 which is protruded from the first case 3 in the "Z" direction and a compression coil spring 67 are disposed in an inside of the through hole 65. The compression coil spring 67 is disposed on a front side relative to the engaging part 66 in a state that its axial line is directed in the "Y" direction and its rear end is engaged with the engaging part 66 and its front end is engaged with the switch member 61. In this manner, the compression coil spring 67 urges the switch member 61 toward the tact switch 20.

In this embodiment, when the output gear 25 is turned by one rotation in the clockwise CW direction, the cam 53 is also turned by one rotation in the CW direction. When the cam 53 is turned, the protruded part 54 of the cam 53 slides on the sliding part 62a to reciprocate the switch member 61 in the "Y" direction. In other words, the switch member 61 is moved from a separated position where the operation part 64 of the switch member 61 is separated from the tact switch 20 as shown in FIG. 3(a), and is reached to a pressing position where the operation part 64 presses the tact switch 20, and then the switch member 61 is returned to the separated position again where the operation part 64 of the switch member 61 is separated from the tact switch 20 as shown in FIG. 3(b). Therefore, while the output gear 25 is turned by one rotation, the tact switch 20 is switched from an OFF state to an ON state and then returned to an OFF state again. A signal based on the state of the tact switch 20 is inputted into the control section 106 of the refrigerator 100 through the wiring line 8. The control section 106 of the refrigerator 100 detects that the rack 6 is disposed at the standby position 6A or the protruded position 6B when the tact switch 20 is in an OFF state.

(First Composite Gear)

Figure 5A:
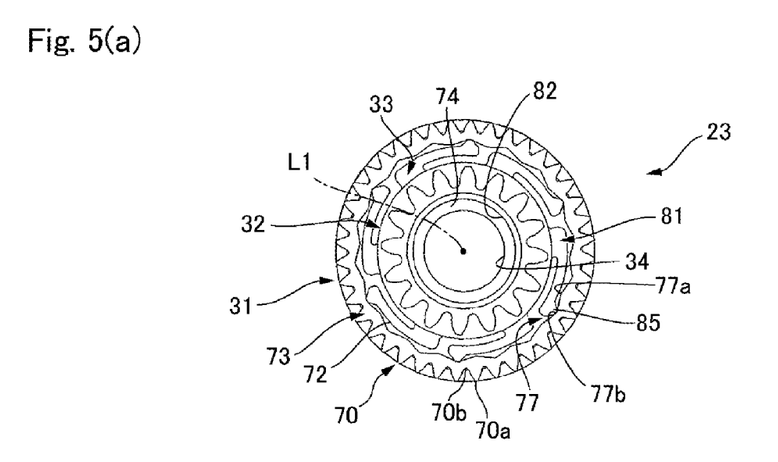
FIGS. 5(a), 5(b) and 5(c) are explanatory views showing a first composite gear on which a torque limiter is mounted.
Figure 5B:
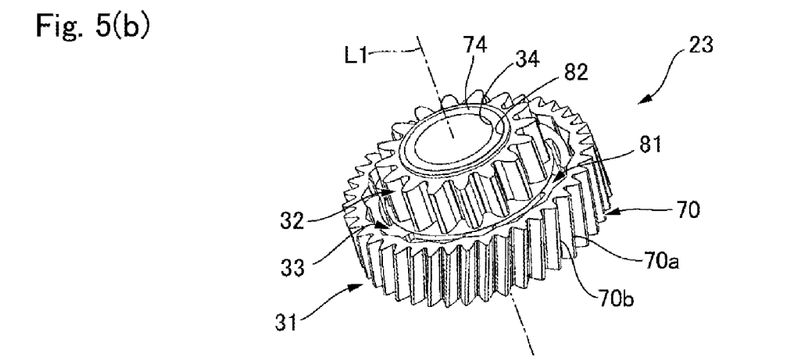
Figure 5C:
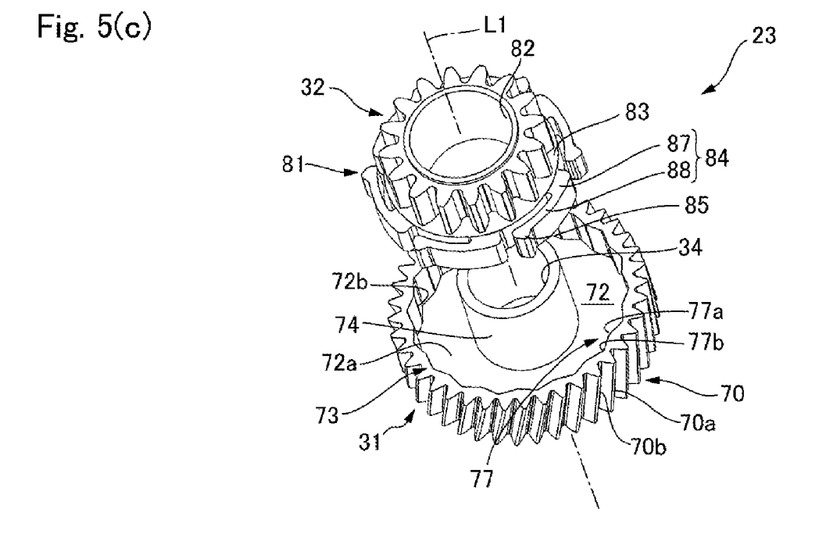
Figure 6A:
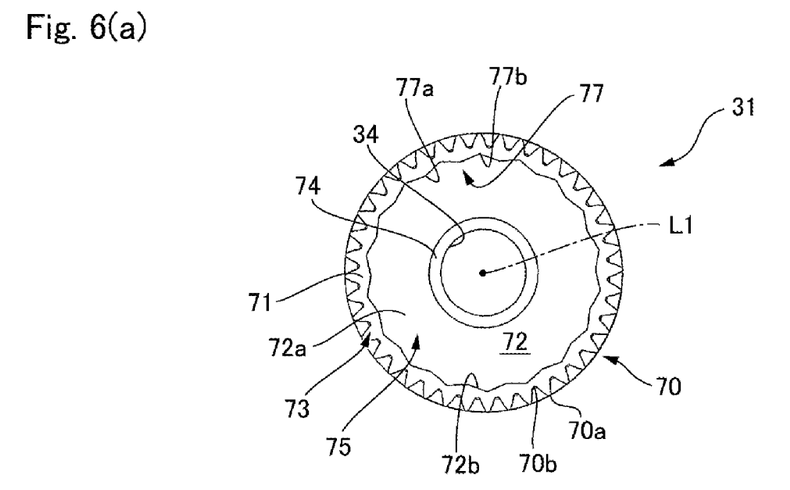
FIGS. 6(a), 6(b) and 6(c) are explanatory views showing a first large diameter gear which is provided with a recessed part for structuring a torque limiter.
Figure 6B:
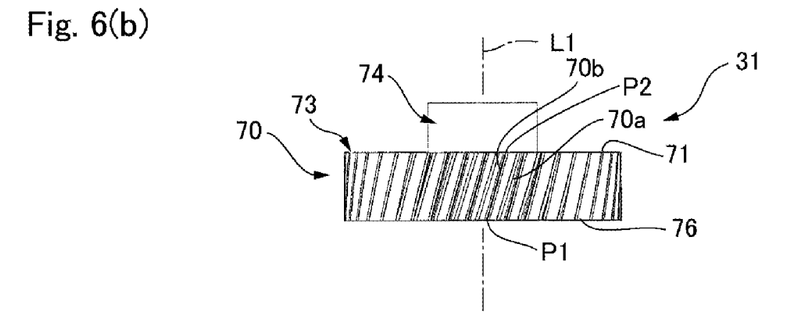
Figure 6C:
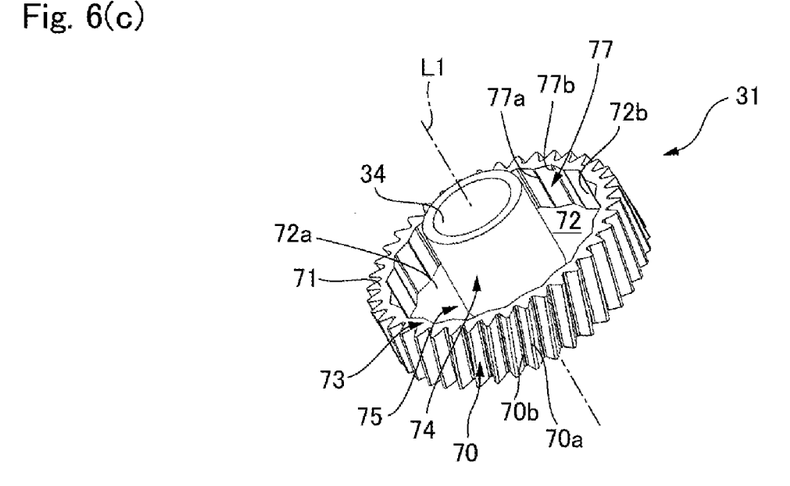
Figure 7A:
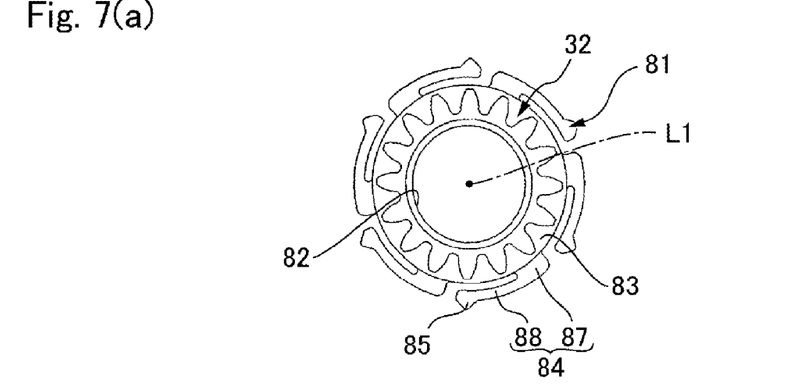
FIGS. 7(a), 7(b) and 7(c) are explanatory views showing a first small diameter gear and a torque limiter member.

FIG. 5(a) is a plan view showing the first composite gear 23 which is viewed in its axial direction, FIG. 5(b) is a perspective view showing the first composite gear 23 which is viewed from a side of the second case 4, and FIG. 5(c) is an exploded perspective view showing the first composite gear 23. FIG. 6(a) is a plan view showing the first large diameter gear 31 which is viewed in its axial direction, FIG. 6(b) is a side view showing the first large diameter gear 31, and FIG. 6(c) is a perspective view showing the first large diameter gear 31 which is viewed from a side of the second case 4. FIG. 7(a) is a plan view showing the first small diameter gear 32 and the torque limiter member which are viewed in the axial direction, FIG. 7(b) is a perspective view showing the first small diameter gear 32 and the torque limiter member which are viewed from a side of the second case 4, and FIG. 7(c) is a perspective view showing the first small diameter gear 32 and the torque limiter member which are viewed from a side of the first case 3.

As shown in FIGS. 5(a), 5(b) and 5(c) and FIGS. 6(a), 6(b) and 6(c), the first large diameter gear 31 of the first composite gear 23 is an inclined teeth gear whose outer teeth 70 are formed in inclined teeth so as to be capable of engaging with the worm gear 22 which is attached to an output shaft of the motor 11. As shown in FIGS. 6(a) and 6(c), the first large diameter gear 31 is provided with a recessed part 72 on an end face 71 on a side of the first small diameter gear 32 and an outer peripheral side of the recessed part 72 is formed to be a tube-shaped part 73. A tube part 74 is provided at the center of the recessed part 72 so as to extend from a bottom face of the recessed part 72 to a side of the first small diameter gear 32 in the "Z" direction. A center hole of the tube part 74 is a first center hole 34 of the first composite gear 23 and is penetrated through a bottom face 72a of the recessed part 72 in a first axial line "L1" direction ("Z" direction). In other words, the first large diameter gear 31 is provided with the tube-shaped part 73 whose outer peripheral face is formed with inclined teeth, the tube part 74 which is provided at the center of the tube-shaped part 73 so as to be coaxial with the tube-shaped part 73, and a ring-shaped bottom part 75 connecting respective opposite end parts of the tube part 74 and the tube-shaped part 73 to the first small diameter gear 32 with each other. A lower end face 76 on the first case 3 side of the first large diameter gear 31, in other words, a lower end face 76 of the bottom part 75 is formed in a flat face which is perpendicular to the first axial line "L1". Inner teeth 77 are formed on a ring-shaped inner peripheral face 72b of the recessed part 72. Teeth tips 77a and teeth bottoms 77b of the inner teeth 77 are extended in parallel with the first axial line "L1". In this embodiment, the motor 11 is rotated in both directions and thus, similar inclined faces are formed on both sides of the tooth bottom 77b of the inner teeth 77, and a torque limiter is operated for rotation of the motor 11 in both directions. In other words, when a large force exceeding the maximum transmission torque of the torque limiter 33 is applied, engagement of an engaging claw 85 of the torque limiter member 81 with inner teeth 77 of the first large diameter gear 31 is released for both of the rotating directions. The first large diameter gear 31 is a resin molded product.

As shown in FIG. 6(b), the outer teeth 70 of the first large diameter gear 31, in other words, the inclined teeth formed on the outer peripheral face of the tube-shaped part 73 are formed so that their teeth tips 70a are inclined with respect to the first axial line "L1" and their teeth bottoms 70b are inclined with respect to the first axial line "L1". Further, regarding the tooth bottom 70b, an end part "P1" on one side (side of the first case 3) in the first axial line "L1" direction of the first large diameter gear 31 is displaced in a circumferential direction from an end part "P2" of the other side (side of the second case 4) of the first large diameter gear 31 and, when viewed in the first axial line "L1" direction, the end part "P1" and the end part "P2" are not overlapped with each other. In this embodiment, the end part "P1" and the end part "P2" are displaced from each other by one tooth in the circumferential direction but the displaced amount is not limited to the amount corresponding to one tooth. The inclination angle of the tooth bottom 70b may be set at an angle which is capable of reducing a region of a thin portion formed by overlapping the tooth bottom 70b of the outer teeth 70 with the tooth bottom 77b of the inner teeth 77 so as to secure the strength of the outer teeth 70. In other words, in the first large diameter gear 31, the tooth bottom 70b is not extended to be parallel to the first axial line "L1" from the upper end to the lower end of the tube-shaped part 73 at any position in the circumferential direction.

Figure 7B:
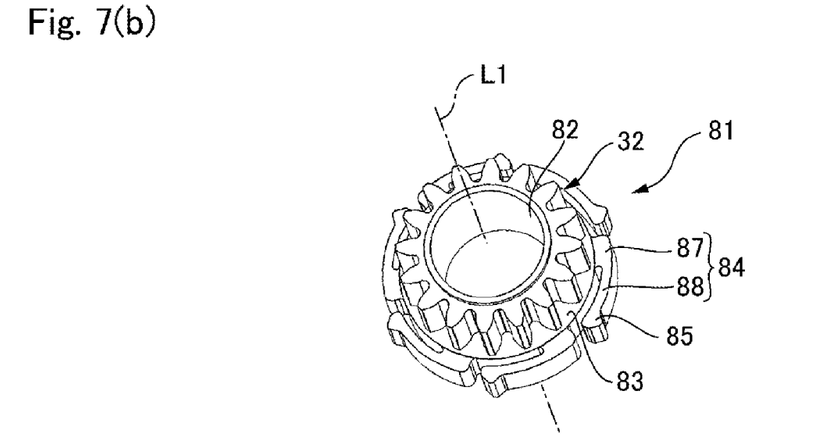
Figure 7C:
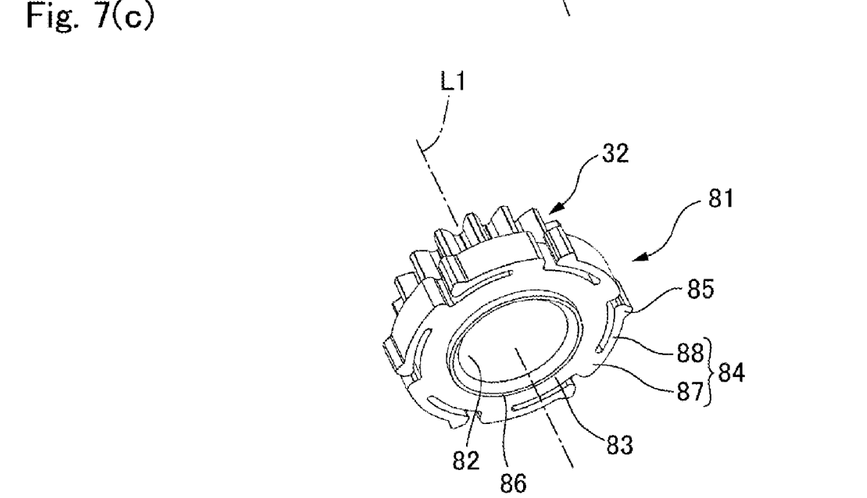

As shown in FIGS. 7(a), 7(b) and 7(c), the first small diameter gear 32 is provided with a torque limiter member 81 on a side of the first large diameter gear 31. The torque limiter member 81 structures a torque limiter 33 together with the inner teeth 77 provided in the first large diameter gear 31 and is coaxially disposed with the first small diameter gear 32. The first small diameter gear 32 and the torque limiter member 81 are integrally molded each other into a resin molded product. A through hole 82 penetrating in the first axial line "L1" direction ("Z" direction) is provided at the center of the first small diameter gear 32 and the torque limiter member 81.

The torque limiter member 81 is provided with a tube-shaped body part 83 and arm parts 84 which are protruded to an outer peripheral side from the body part 83 and are extended in the circumferential direction (CW direction) and whose tip end side portion is capable of displacing in the radial direction. Six arm parts 84 are provided at an equal interval in the circumferential direction of the body part 83. A tip end portion of the arm part 84 is provided with an engaging claw 85 which is capable of engaging with the inner teeth 77. An opening edge portion of the through hole 82 on an under face on the first case 3 side of the body part 83 is, as shown in FIG. 7(c), provided with a ring-shaped protruded part 86 protruding to a constant height toward a side of the first large diameter gear 31.

More specifically, the arm part 84 is provided with a base part 87, which is protruded to an outer side in the radial direction from an outer peripheral face of the body part 83, and a circular arc part 88 which is extended in a circumferential direction along the outer peripheral face of the body part 83 from an end part on an outer peripheral side of the base part 87 toward one side in the circumferential direction. A space is formed between the circular arc part 88 and the outer peripheral face of the body part 83. The engaging claw 85 is protruded to an outer peripheral side from a tip end portion of the circular arc part 88. The engaging claw 85 is a projection extending in the "Z" direction and its shape viewed in the "Z" direction is a roughly triangular shape. In this embodiment, an outer diameter dimension of the body part 83 is larger than a diameter dimension of a tooth tip circle of the first small diameter gear 32. Therefore, as shown in FIGS. 7(a) and 7(b), when viewed in the "Z" direction, the arm part 84 and the engaging claw 85 are located on the outer peripheral side relative to the first small diameter gear 32.

The torque limiter 33 is, as shown in FIGS. 5(a), 5(b) and 5(c), structured by disposing the torque limiter member 81 integrally formed with the first small diameter gear 32 in the recessed part 72 of the first large diameter gear 31. In other words, the tube part 74 of the first large diameter gear 31 is inserted into the through hole 82 which is penetrated through the first small diameter gear 32 and the torque limiter member 81. In this manner, the first small diameter gear 32 and the torque limiter member 81 are set in a rotatable state around the first axial line "L1" on the first large diameter gear 31. Next, the engaging claw 85 of the torque limiter member 81 is located on an inner peripheral side of the tooth bottom 70b of the inner teeth 77 of the first large diameter gear 31 and is set in a state that the engaging claw 85 and the inner teeth 77 are engaged with each other and then, the torque limiter member 81 is inserted in the recessed part 72 of the first large diameter gear 31. As a result, the torque limiter 33 is structured.

In this embodiment, a height dimension in the "Z" direction of the torque limiter member 81 is shorter than a depth dimension of the recessed part 72 of the first large diameter gear 31 and thus, the torque limiter member 81 is completely accommodated in the recessed part 72. Therefore, in a state that the torque limiter member 81 is accommodated in the recessed part 72 of the first large diameter gear 31, when viewed in a direction perpendicular to the "Z" direction, the first composite gear 23 is structured so that the teeth part of the first small diameter gear 32 and the teeth part of the first large diameter gear 31 are adjacently disposed to each other in the "Z" direction.

(Operation of Drawer Drive Device)

An open operation where the drawer drive device 1 opens the drawer 101 will be described below with reference to FIG. 1 and FIGS. 3(a) and 3(b). First, for example, the drawer 101 is disposed at the close position 101A as shown by the solid line in FIG. 1. Further, in this state, the rack 6 of the drawer drive device 1 is disposed at the standby position 6A as shown in FIG. 3(a). The tip end side of the rack 6 is abutted with the operated part 107 provided in the drawer 101 from a rear side.

In this state, when a switch for opening the drawer 101 is operated, a drive signal is inputted from the control section 106 of the refrigerator 100 through the wiring line 8. As a result, the motor 11 is driven in the first direction. Rotation in the first direction of the motor 11 is transmitted to the output gear 25 while decelerated through the worm gear 22, the first composite gear 23, and the second composite gear 24. As a result, when the output gear 25 is turned by one rotation in the clockwise "CW" direction, the rack 6 is moved from the standby position 6A to the protruded position 6B shown in FIG. 3(b) through turning of the output gear 25. The drawer 101 is pushed out from the close position 101A shown in FIG. 1 to the opened position 101C by movement of the rack 6.

In this embodiment, during one rotation of the output gear 25 in the CW direction, the switch member 61 reciprocates in the "Y" direction to change the tact switch 20 from the OFF state to the ON state, and then to the OFF state again. When the tact switch 20 is returned to the OFF state again, the control device of the refrigerator 100 judges that the rack 6 has been reached to the protruded position 6B and drives the motor 11 in the second direction which is opposite to the first direction.

Rotation in the second direction of the motor 11 is transmitted to the output gear 25 while decelerated through the worm gear 22, the first composite gear 23 and the second composite gear 24. As a result, when the output gear 25 is turned by one rotation in the counterclockwise "CCW" direction, the rack 6 is returned to the standby position 6A shown in FIG. 3(a) from the protruded position 6B through rotation of the output gear 25.

In this embodiment, during one rotation of the output gear 25 in the CCW direction, the switch member 61 reciprocates in the "Y" direction to change the tact switch 20 from the OFF state to the ON state, and then to the OFF state again. When the tact switch 20 is returned to the OFF state again, the control device of the refrigerator 100 judges that the rack 6 has been reached to the standby position 6A and the motor 11 is stopped.

When a user pushes the drawer 101 toward a side of the refrigerator 100 after the rack 6 has been reached to the standby position 6A, the drawer 101 is moved to the close position 101A without interfering with the rack 6. Therefore, a user is capable of closing the drawer 101 with a small force.

In this embodiment, for example, when movement of the drawer 101 is prevented by a user while the motor 11 is driven in the first direction and the rack 6 is moved forward in the "Y" direction, a large force applied to the drawer 101 by the user is transmitted from the rack 6 toward a side of the motor 11 through the rotation transmission mechanism 21.

This force may become so large as to exceed the maximum transmission torque of the torque limiter 33 (maximum torque that the torque limiter 33 is capable of transmitting rotation between the first large diameter gear 31 and the first small diameter gear 32). Therefore, in this case, engagement of the engaging claw 85 of the torque limiter member 81 with the inner teeth 77 of the first large diameter gear 31 is released. As a result, the first large diameter gear 31 and the first small diameter gear 32 structuring the first composite gear 23 are relatively rotated to each other and thus the transmission path of rotation from the rack 6 to the motor 11 is cut off. Therefore, the members structuring the rotation transmission mechanism 21 and the motor 11 are prevented from being damaged due the force from the drawer 101.

Further, when interruption of power supply is occurred while the motor 11 is driven in the second direction and the rack 6 is moved rearward in the "Y" direction, the rack 6 may be stopped at a position between the protruded position 6B and the standby position 6A without returning to the standby position 6A. In this case, when the drawer 101 is pushed inside by a user, a force applied to the drawer 101 by the user is transmitted from the rack 6 toward the motor 11 through the rotation transmission mechanism 21.

In this case, when the force applied from the rack 6 toward the motor 11 is large so as to exceed the maximum transmission torque of the torque limiter 33, engagement of the engaging claw 85 of the torque limiter member 81 with the inner teeth 77 of the first large diameter gear 31 is released. As a result, the first large diameter gear 31 and the first small diameter gear 32 structuring the first composite gear 23 are relatively rotated to each other and thus the rotation transmission mechanism 21 from the rack 6 to the motor 11 is cut off. Therefore, the members structuring the rotation transmission mechanism 21 and the motor 11 are prevented from being damaged due to a force from the drawer 101.

On the other hand, in a case that a force applied from the rack 6 toward the motor 11 is not more than the maximum transmission torque of the torque limiter 33, the force is transmitted to the motor 11. In other words, in this embodiment, a torque which is required to turn the first large diameter gear 31 and thereby the worm gear 22 is rotated in the rotation transmission mechanism 21 is set to be smaller than the maximum transmission torque of the torque limiter 33. Therefore, in a case that a force applied from the rack 6 toward the motor 11 is not more than the maximum transmission torque of the torque limiter 33, the worm gear 22 is rotated by the first large diameter gear 31 while the rack 6 is moved toward the standby position 6A and thus the motor 11 is also rotated in the second direction.

In this embodiment, the rear end portions of a pair of the rails 102 are provided with the inclined rail portions 102a which are inclined downward toward a rear side. When the drawer 101 is located in the vicinity of the close position 101A, the rear end portion of the drawer 101 is located on the inclined rail portions 102a and thus the drawer 101 is moved to the close position 101A by its own weight. Further, the drawer 101 having been moved to the close position 101A is maintained by its own weight in a closed state where the drawer 101 is disposed at the close position 101A until the drawer drive device 1 is driven or the drawer 101 is drawn out by a user.

In this embodiment, in a case that the rack 6 is stopped at a position between the protruded position 6B and the standby position 6A without returning to the standby position 6A due to occurrence of interruption of power supply, when the drawer 101 is located in the vicinity of the close position 101A, the drawer 101 is moved to the close position 101A while pushing the rack 6 toward the standby position 6A by its own weight. In this embodiment, a force applied from the rack 6 toward the motor 11 by the own weight of the drawer 101 is not more than the maximum transmission torque of the torque limiter 33. Further, in this embodiment, a torque which is required to turn the first large diameter gear 31 for rotating the worm gear 22 in the rotation transmission mechanism 21 is set to be smaller than the maximum transmission torque of the torque limiter 33. Therefore, while the drawer 101 is moved from a position near the close position 101A toward the close position 101A by its own weight and, as a result, while the rack 6 is moved toward the standby position 6A, the worm gear 22 is rotated by the first large diameter gear 31 and the motor 11 is rotated in the second direction.

(Principal Effects in this Embodiment)

In this embodiment, the first large diameter gear 31 which is provided with the recessed part 72 for the torque limiter 33 on the end face 71 is an inclined teeth gear and its teeth bottoms 70b are inclined with respect to the first axial line "L1". Therefore, even when the inner teeth 77 whose teeth bottoms 77*b* are extended in parallel with the first axial line "L1" are provided on the ring-shaped inner peripheral face 72*b* of the recessed part 72, lowering of strength of the first large diameter gear 31 is suppressed and the size of the first large diameter gear 31 can be reduced in the radial direction.

In other words, in a case that the first large diameter gear 31 is a spur gear, teeth bottoms of the outer teeth provided on the outer peripheral face of the tube-shaped part 73 are formed in parallel with the first axial line "L1" and thus, in an overlapped portion where a tooth bottom of the outer teeth of the tube-shaped part 73 and a tooth bottom 77*b* of the inner teeth 77 are overlapped with each other in the radial direction, its thickness in the radial direction becomes extremely thin. Further, the thin portion is extended in the first axial line "L1" direction and is formed at plural positions with a constant interval in the circumferential direction. Therefore, in this case, strength of the first large diameter gear 31 is decreased and thus the first large diameter gear 31 may be easily damaged.

On the other hand, according to this embodiment, the first large diameter gear 31 is an inclined teeth gear and thus, the teeth bottoms 70*b* are not formed so as to be parallel with the first axial line "L1" continuously from the upper end of the tube-shaped part 73 to its lower end at any angular position in the circumferential direction. Therefore, even when the position of the tooth bottom 77*b* of the inner teeth 77 and the position of the tooth bottom 70*b* of the outer teeth 70 are coincided with each other in the circumferential direction, when viewed in the radial direction, the tooth bottom 70*b* of the outer teeth 70 is overlapped with the tooth bottom 77*b* of the inner teeth 77 in an intersected manner and the tooth tip 70*a* of the first large diameter gear 31 is also overlapped with the tooth bottom 77*b* in an intersected manner. As a result, different from a case that the first large diameter gear 31 is a spur gear, a thin portion extended in the "Z" direction which is formed at positions in the circumferential direction when the tooth bottom 77*b* of the inner teeth 77 and the tooth bottom of the outer teeth are coincided with each other in the first axial line "L1" direction is prevented from being formed in the circumferential direction of the tube-shaped part 73 and thus, lowering of strength of the first large diameter gear 31 is suppressed. Therefore, in comparison with a case that the first large diameter gear 31 is a spur gear, a space in the end face 71 between the circumscribing circle circumscribing the recessed part 72 and the tooth tip circle can be made narrower and the first large diameter gear 31 can be made smaller in the radial direction.

In this embodiment, a thickness of the thinnest portion of the tube-shaped part 73 of the first large diameter gear 31 where the tooth bottom 77*b* of the inner teeth 77 and the tooth bottom 70*b* of the outer teeth 70 are coincided with each other in the circumferential direction is 1.6 mm. However, the first large diameter gear 31 is an inclined teeth gear and thus the teeth bottoms 70*b* are not formed so as to be parallel with the first axial line "L1" continuously from the upper end of the tube-shaped part 73 to its lower end at any angular position in the circumferential direction. Therefore, when viewed in the radial direction, the teeth tips 70*a* of the first large diameter gear 31 are respectively overlapped with the teeth bottoms 70*b* of the inner teeth 77 in an intersected manner and thus strength of the first large diameter gear 31 can be secured.

Further, in this embodiment, the tube part 74 which is provided at the center of the recessed part 72 of the first large diameter gear 31 is formed as a bearing into which the first support shaft 35 for rotatably supporting the first large diameter gear 31 is inserted. In addition, the torque limiter member 81 which is disposed in the recessed part 72 of the first large diameter gear 31 is provided with the arm parts 84 which are protruded to the outer peripheral side from the body part 83 and are extended in the circumferential direction. In such the structure, the recessed part 72 of the first large diameter gear 31 is required to be formed larger in the radial direction for securing a space for accommodating the torque limiter member 81. However, according to this embodiment, the first large diameter gear 31 is structured of an inclined teeth gear and thus, while suppressing lowering of the strength of the first large diameter gear 31, the size of the first large diameter gear 31 can be restrained from increasing in the radial direction.

In addition, in this embodiment, the first composite gear 23 is disposed between the motor 11 and the output gear 25 in a linearly moving direction of the rack 6 ("Y" direction) and thus, when the size of the first composite gear 23 is made small in the radial direction, the size of the device can be reduced in the linearly moving direction of the rack 6. Further, the first composite gear 23 is disposed between the worm gear 22 and the rack 6 in an orthogonal direction ("X" direction) intersecting the linearly moving direction of the rack 6 and thus, when the size of the first composite gear 23 is made small in the radial direction, the size of the drawer drive device 1 can be reduced in the orthogonal direction.

Further, in this embodiment, the worm gear 22 is used as a gear which is engaged with the first large diameter gear 31 of the first composite gear 23 and thus, in comparison with a case that an inclined teeth gear is used as a gear which is engaged with the first large diameter gear 31 that is an inclined teeth gear, the number of the inclined teeth gears whose working is difficult is reduced.

In addition, in this embodiment, the torque limiter 33 is structured in the recessed part 72 provided in the end face 71 of the first large diameter gear 31 and thus, the size of the first composite gear 23 on which the torque limiter 33 is mounted can be reduced in the axial line "L3" direction ("Z" direction) of the output gear 25. Therefore, the drawer drive device 1 is thinly structured in the axial line "L3" direction ("Z" direction) of the output gear 25.

In the embodiment described above, the inclined rail portions 102*a* are provided on the rear end portions of a pair of the rails 102 and the drawer 101 located in the vicinity of the close position 101A is brought to the close position 101A by its own weight. However, it may be structured that magnets attracted each other are mounted on the drawer 101 and the refrigerator 100 and thereby the drawer 101 located in the vicinity of the close position 101A is brought to the close position 101A by the magnetic attraction force. Also in this case, it may be structured that, in the rotation transmission mechanism 21, a torque required to turn the first large diameter gear 31 for rotating the worm gear 22 is set to be smaller than the maximum transmission torque of the torque limiter 33 and, when the drawer 101 is to be moved from the vicinity of the close position 101A to the closed position 101A by the magnetic attraction force, in a case that the rack 6 is not returned to the standby position 6A, the worm gear 22 is rotated by the first large diameter gear 31 and the motor 11 is rotated in the second direction while the drawer 101 is moved to the close position 101A.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A gear mechanism comprising:
a first gear;
a second gear which is coaxially disposed with the first gear and is provided with a recessed part on an end face of a first gear side and a tube-shaped part formed on an outer peripheral side of the recessed part; and
a torque limiter provided between the first gear and the second gear,
wherein the torque limiter comprises:
inner teeth which are provided on a ring-shaped inner peripheral face of the tube-shaped part and the recessed part; and
a torque limiter member which is provided with an engaging claw which is capable of engaging with the inner teeth and integrally rotates together with the first gear in the recessed part; and
wherein the second gear is an inclined teeth gear in which an outer face of the tube-shaped part is formed with teeth bottoms inclined with respect to an axial line direction and teeth bottoms of the inner teeth of the tube-shaped part are extended in parallel with the axial line direction so that, when viewed in a radial direction, an overlapped thin portion of the tooth bottom of the inner teeth with the tooth bottom of the outer face of the tube-shaped part is reduced to secure strength of the tube-shaped part; and
wherein the inclined teeth gear which is the second gear is directly engaged with a worm gear rotationally driven by a motor.

2. The gear mechanism according to claim 1, wherein
the torque limiter member is provided with a body part which is coaxially provided with the first gear and an arm part which is protruded to an outer peripheral side from the body part and is extended in the circumferential direction, a tip end side portion of the arm part being capable of displacing in the radial direction,
the engaging claw is provided at a tip end portion of the arm part,
the arm part is located on an outer peripheral side relative to the first gear when viewed in the axial line direction, and
the first gear and the torque limiter member are integrally molded by using resin.

3. The gear mechanism according to claim 2, wherein
the second gear is provided with a tube part which is extended in the axial line direction from a bottom face of the recessed part, and
a center hole of the tube part penetrates through the second gear and is formed as a bearing into which a support shaft for rotatably supporting the second gear is inserted.

4. A drawer drive device used in a refrigerator comprising:
a motor;
a rack which is linearly moved by the motor for moving a drawer in the refrigerator;
an output gear which is engaged with the rack; and
a rotation transmission mechanism for transmitting rotation of the motor to the output gear;
wherein the rotation transmission mechanism comprises a gear mechanism and a worm gear,
wherein the gear mechanism comprises:
a first gear;
a second gear which is coaxially disposed with the first gear and is provided with a recessed part on an end face of a first gear side and a tube-shaped part formed on an outer peripheral side of the recessed part; and
a torque limiter provided between the first gear and the second gear,
wherein the torque limiter comprises:
inner teeth which are provided on a ring-shaped inner peripheral face of the recessed part; and
a torque limiter member which is provided with an engaging claw which is capable of engaging with the inner teeth and integrally rotates together with the first gear in the recessed part; and
wherein the second gear is an inclined teeth gear in which an outer face of the tube-shaped part is formed with teeth bottoms inclined with respect to an axial line direction and teeth bottoms of the inner teeth of the tube-shaped part are extended in parallel with the axial line direction so that, when viewed in a radial direction, an overlapped thin portion of the tooth bottom of the inner teeth with the tooth bottom of the outer face of the tube-shaped part is reduced to secure strength of the tube-shaped part; and
wherein the worm gear is directly engaged with the inclined teeth gear which is the second gear of the gear mechanism; and
wherein rotation of the motor is transmitted to the worm gear, the second gear and the first gear of the gear mechanism in this order.

5. The drawer drive device according to claim 4, wherein a torque which is required to rotate the worm gear by the second gear is smaller than the maximum torque of the torque limiter which is capable of transmitting rotation from the second gear to the first gear.

6. The drawer drive device according to claim 4, wherein
the axial line direction of the gear mechanism is directed in a direction which is parallel with a rotation shaft of the output gear and is perpendicular to a linearly moving direction of the rack, and
the gear mechanism is disposed between the motor and the output gears in the linearly moving direction.

7. The drawer drive device according to claim 4, wherein
the axial line direction of the gear mechanism is directed in a direction which is parallel with a rotation shaft of the output gear and is perpendicular to a linearly moving direction of the rack, and
the gear mechanism is disposed between the worm gear and the rack in an orthogonal direction perpendicular to the linearly moving direction and the axial line direction.

8. The drawer drive device according to claim 4, wherein
the torque limiter member is provided with a body part which is coaxially provided with the first gear and an arm part which is protruded to an outer peripheral side from the body part and is extended in the circumferential direction, a tip end side portion of the arm part being capable of displacing in the radial direction,
the engaging claw is provided at a tip end portion of the arm part,
the arm part is located on an outer peripheral side relative to the first gear when viewed in the axial line direction, and
the first gear and the torque limiter member are integrally molded by using resin.

9. The drawer drive device according to claim 4, wherein the second gear is provided with a tube part which is extended in the axial line direction from a bottom face of the recessed part, and
a center hole of the tube part penetrates through the second gear and is formed as a bearing into which a support shaft for rotatably supporting the second gear is inserted.

10. The drawer drive device according to claim 4, wherein the worm gear is attached to an output shaft of the motor.

11. The drawer drive device according to claim 4, wherein the motor is a motor which is capable of rotating in both directions.

* * * * *